United States Patent
Tooyama et al.

[11] 4,314,179
[45] Feb. 2, 1982

[54] HORIZONTAL SCANNING RATE CORRECTION APPARATUS

[75] Inventors: Akira Tooyama; Takashi Hosono, both of Kanagawa, Japan

[73] Assignee: Sony Corporation, Tokyo, Japan

[21] Appl. No.: 135,667

[22] Filed: Mar. 31, 1980

[30] Foreign Application Priority Data

Apr. 3, 1979 [JP] Japan .................................. 54-40138

[51] Int. Cl.³ ............................................. H01J 29/41
[52] U.S. Cl. .................................. 315/12 ND; 358/69
[58] Field of Search ................... 315/12 ND, 371, 10; 358/67, 69

[56] References Cited

U.S. PATENT DOCUMENTS

| | | | |
|---|---|---|---|
| 3,735,029 | 5/1973 | Sunstein | 358/69 |
| 4,263,614 | 4/1981 | Tominaga | 358/69 |

*Primary Examiner*—Theodore M. Blum
*Attorney, Agent, or Firm*—Lewis H. Eslinger; Alvin Sinderbrand

[57] ABSTRACT

A horizontal scanning rate correction apparatus for a cathode-ray tube, particularly of the beam index color cathode-ray tube type, includes a memory for storing correction values representing deviations of the horizontal scanning rate of the electron beam from a desired scanning rate; a reading circuit for reading the correction values from the memory; a correcting signal forming circuit for sensing fluctuation in the value of a high voltage supplied to an anode of the cathode-ray tube from a high voltage source and for producing a correcting signal in response thereto in accordance with the formula: $\Delta V(t) = a(V_H(t) - V_{HO}) - b' x_H \cdot (d/dt \cdot V_H(t))$, where $V_H(t)$ is the instantaneous value of the high voltage, $V_{HO}$ is a constant value voltage, $a$ and $b$ are constants and $X_H$ corresponds to the amount of electron beam deflection; and a scanning rate modulating circuit supplied with the correction values read by the reading circuit and supplied with the correcting signal for substantially cancelling any deviation in the horizontal scanning rate from the desired rate.

12 Claims, 6 Drawing Figures

HORIZONTAL SCANNING RATE CORRECTION APPARATUS

BACKGROUND OF THE INVENTION

1. Field of the Invention

This invention relates generally to beam index color television receivers and, more particularly, is directed to apparatus for controlling the horizontal beam scanning rate in a beam index color television receiver.

2. Description of the Prior Art

Beam index color television receivers are well known in the art, and usually include a cathode-ray tube, or picture tube, having an electron gun which emits a single electron beam and a phosphor screen in which red, green and blue color phosphor stripes are repeatedly arranged in the horizontal beam scanning direction. The beam index picture tube also has a plurality of index phosphor stripes arranged across the phosphor screen in the horizontal beam scanning direction in a known relationship to the spacing of the color phosphor stripes. When the single electron beam horizontally scans the screen, a photodetector generates an index signal in response to light emitted each time an index stripe is struck by the electron beam. This index signal is supplied to, for example, a phase-locked loop circuit (PLL circuit) for achieving color registration by controlling the color switching circuit which determines when the three primary color signals respectively modulate the intensity of the electron beam so that, at any moment, the intensity of the electron beam is modulated by the primary color signal whose corresponding color phosphor stripe is then being scanned by the beam. Thus, the electron beam is density-modulated by the red primary color signal when the electron beam scans the red color phosphor strips, by the green primary color signal when the electron beam scans the green color phosphor strips, and by the blue primary color signal when the electron beam scans the blue color phosphor stripes, respectively.

The frequency of the index signal is inversely proportional to the pitch of the index phosphor stripes and is proportional to the electron beam scanning rate in the horizontal direction. Therefore, if the horizontal scanning rate is varied, the frequency of the index signal fluctuates.

A time lag occurs during the time from detection of the index signal by the photodector to color switching. As a result, if the horizontal scanning rate varies so as to result in fluctuation in the frequency of index the signal, as previously mentioned, a consequent timing deviation results in the color switching which, in turn, results in color misregistration. Deviations in the horizontal scanning rate are also disadvantageous in beam index color television receivers because they make it more difficult for the PLL circuit to correctly follow and lock onto the index signal, as is necessary for proper color registration.

Accordingly, in a beam index color television receiver, it is desirable to provide for correction of the horizontal scanning rate to reduce any distortion in the horizontal deflection of the electron beam.

A horizontal scanning rate correction apparatus for reducing distortion in the horizontal deflection of the electron beam, that is, which provides for correction of the horizontal scanning rate, is disclosed in U.S. patent application Ser. No. 06/100,820, filed Dec. 6, 1979, and having a common assignee herewith. In such application, information regarding the horizontal scanning rate which has previously been written into a memory is used, during deflection of the electron beam, to drive a horizontal deflection correcting device, such as a horizontal deflection correcting coil, to further deflect an electron beam, thus so as to correct the horizontal scanning rate.

However, even with the above apparatus, a high voltage fed to the cathode ray tube fluctuates in response to changes in the cathode ray tube current which causes the size of the raster on the picture screen, to also change. This causes the electron beam deflection speed to change and, as a result, there is a deviation in the horizontal deflection linearity.

SUMMARY OF THE INVENTION

Accordingly, it is an object of this invention to provide a horizontal scanning rate correction apparatus that avoids the above-described difficulties encountered with the prior art.

More particularly, it is an object of this invention to provide a horizontal scanning rate correction apparatus in which a previously stored output signal from a memory is used to correct any horizontal deflection distortion and the horizontal deflection scanning rate is modulated in accordance with fluctuation in the high voltage supplied to the cathode ray tube to further correct any horizontal deflection distortion.

In accordance with an aspect of this invention, a horizontal scanning rate correction apparatus is provided for a cathode-ray tube having a screen, means for projecting an electron beam upon the screen, an anode supplied with a high voltage from a high voltage source, and a beam deflection device supplied with at least horizontal and vertical beam deflection signals for causing the beam to repeatedly scan across the screen in a vertical succession of horizontal lines. The apparatus includes memory means for storing a plurality of correction values representing deviations of the horizontal scanning rate of the electron beam from a desired scanning rate; reading means for reading the plurality of stored correction values from the memory means; correcting signal forming means for sensing fluctuation in the value of the high voltage from the high voltage source and for producing a correcting signal in response thereto; and scanning rate modulating means supplied with the plurality of correction values read by the reading means and supplied with the correcting signal from the correcting signal forming means for substantially cancelling any deviation in the horizontal scanning rate from the desired scanning rate.

The above, and other objects, features and advantages of this invention, will be apparent from the following detailed description of illustrative embodiments of the invention which is to be read in connection with the accompanying drawings.

DESCRIPTION OF THE PREFERRED EMBODIMENTS

Figure 1:
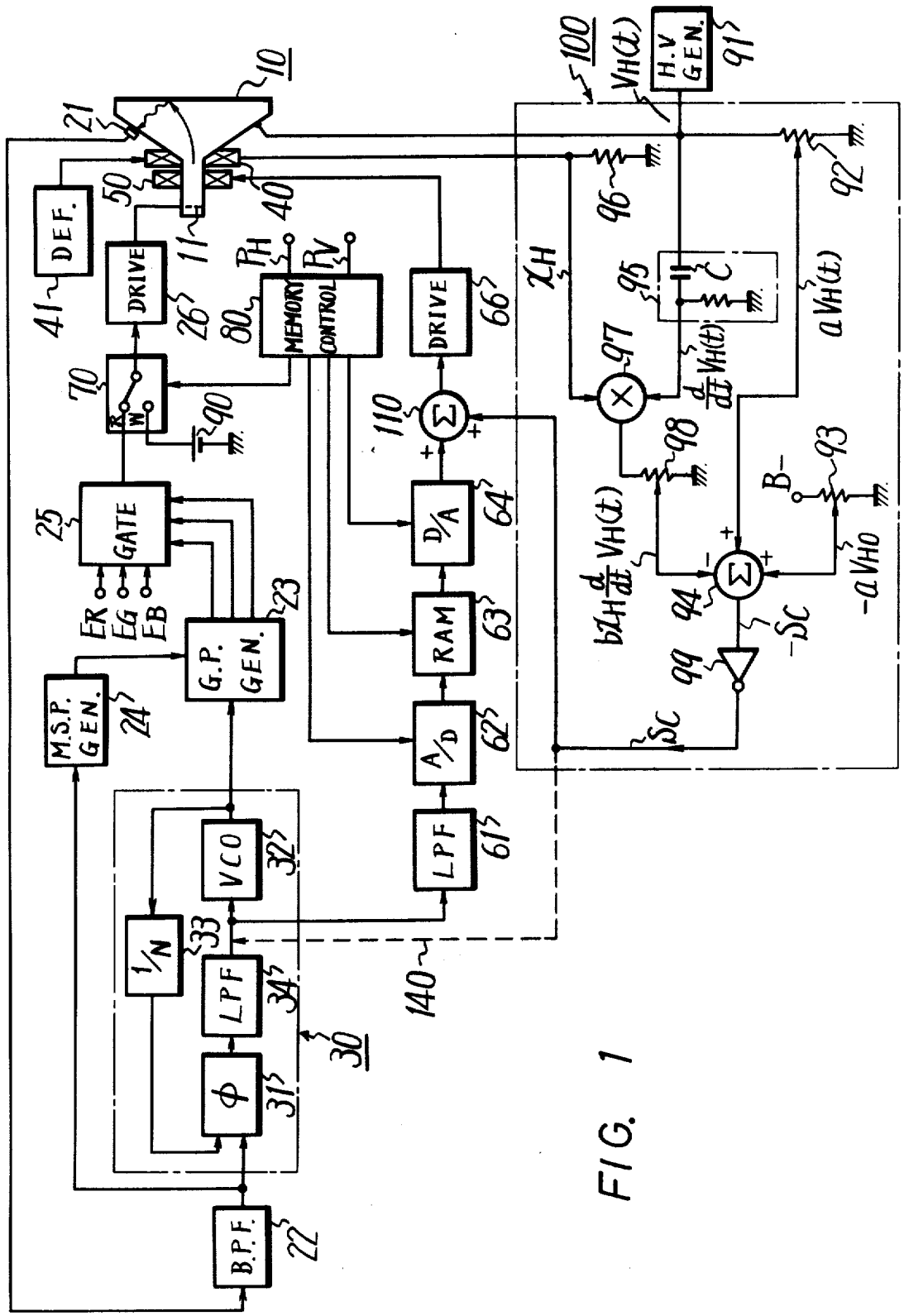
FIG. 1 is a block diagram of a horizontal scanning rate correction apparatus according to one embodiment of this invention and which is shown applied to a beam index color cathode ray tube.

Referring to the drawings in detail, and initially to FIG. 1 thereof, there is shown a beam index color cathode-ray tube or picture tube 10 having a photodetector 21 provided at the outside of the funnel-shaped portion of the envelope of color cathode ray tube 10. An output signal from photodetector 21 is supplied to a band-pass filter 22 to derive therefrom an index signal the frequency of which is determined by the pitch of the index phosphor stripes of the cathode ray tube and the electron beam scanning rate. This index signal is supplied to a phase-locked loop (PLL) circuit 30, which consists of a phase comparator 31, a voltage-controlled oscillator (VCO) 32, a frequency divider 33, and a low-pass filter 34.

In particular, the index signal from band-pass filter 22 is supplied to one input of phase comparator 31. An output pulse of from VCO 32 is supplied to frequency divider 33 where it is frequency-divided by 1/N and this frequency-divided pulse is supplied to the other input of phase comparator 31. An output voltage from phase comparator 31 is supplied through low-pass filter 34 to VCO 32 where the previously-mentioned output-pulse is produced having a frequency which is N times the frequency of the index signal, that is, three times the so-called triplet frequency, and which is determined by the pitch of a triad of color phosphor stripes of color cathode ray tube 10 and by the electron beam scanning rate.

The beam index color television receiver according to this invention includes a horizontal deflection correcting device 50 in addition to a primary horizontal deflection device 40, both provided along the neck of cathode ray tube 10. During a predetermined time period starting from the turning-ON of a power switch, a control signal from a memory control circuit 80 is applied to a switch circuit 70 whereby the movable arm thereof contacts fixed input terminal W. At this time, a constant level DC voltage is fed from a voltage source 90 through terminal W of switch circuit 70 and through a drive circuit 26 to, for example, the first grid 11 of color cathode ray tube 10 so that a constant beam current produced in cathode ray tube 10.

The output of low-pass filter 34 which is applied to VCO 32 as the control voltage therefor has a level proportional to the frequency of the index signal. This means that this control voltage includes information regarding the horizontal beam scanning rate. The output voltage of low-pass filter 34, at a time when the constant beam current flows in cathode ray tube 10, is also supplied to a low-pass filter 61, which in turn, produces a low frequency signal representative of frequency fluctuation in the index signal, that is the low frequency signal constitutes an information signal which contains information regarding the horizontal beam scanning rate. This information signal is supplied to an analog-to-digital converter (A-D converter) 62 where it is converted into a digital signal and written into a memory 63, for example, a random access memory (RAM).

In the above embodiment, a vertical synchronizing signal $P_V$ and a horizontal synchronizing signal $P_H$ are supplied to memory control circuit 80 which, in turn, supplies a clock pulse to A-D converter 62 and an address signal to memory 63.

During a normal playblack operation after the predetermined time period has lapsed, control circuit 80 supplies a control signal to switch circuit 70 whereby the movable arm thereof contacts fixed input terminal R. At this time, the aforesaid output pulse of VCO 32 is supplied from PLL circuit 30 to a gate pulse generator 23 consisting of a ring counter and the index signal from band-pass filter 22 is supplied to a mode set pulse generator 24 and a mode set pulse therefrom is also supplied to gate pulse generator 23. Thus, gate pulse generator 23 produces 3-phase gate pulses for sequentially gating the red, green and blue primary color signals with the phases of the gate pulses being sequentially arranged by the mode set pulse.

The gate pulses from generator 23 are supplied to a gate circuit 25 to sequentially gate the red, green and blue primary color signals $E_R$, $E_G$ and $E_B$ and these latter signals are supplied through contact R of switch circuit 70 and through drive circuit 26 to first grid 11 of cathode ray tube 10. At this time, the information signal containing information regarding the horizontal beam scanning rate is read from memory 63 and supplied to a digital-to-analog converter (D-A converter) 64 where it is converted into an analog signal. This analog signal is supplied through a drive circuit 66 to horizontal deflection correcting device 50. At this time, vertical synchronizing signal $P_V$ and horizontal synchronizing signal $P_H$ are supplied to control circuit 80 which, in turn, supplies an address signal to memory 63 and a clock pulse to D-A converter 64.

Figure 2:
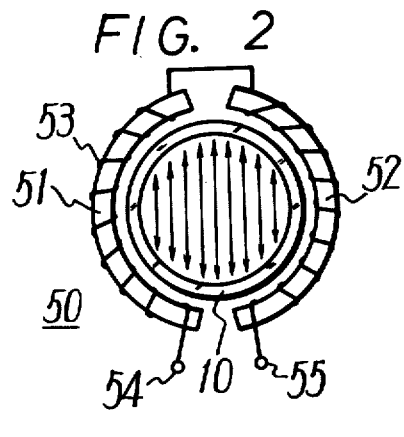
FIG. 2 is a schematic plan view showing one embodiment of a correction coil included in the horizontal deflection correcting device used with the color cathode ray tube of FIG. 1.

Horizontal deflection correcting device 50 is preferably formed, as shown in FIG. 2, of a pair of ferrite cores 51 and 52 of semi-annular shape which are placed in a horizontally opposing configuration around the neck portion of cathode ray tube 10 at a position near fourth grid thereof. A correction coil 53 is wound around cores 51 and 52, and a signal from drive circuit 66 is supplied between two end terminals 54 and 55 of coil 53. Accordingly, a magnetic field for correction is induced in the vertical direction as indicated by the arrows in FIG. 2 for causing a corresponding horizontal deflection in the electron beam.

The frequency of the index signal is proportional to the electron beam scanning rate, that is, the distance an electron beam moves along the phosphor screen of the cathode ray tube per unit time. This distance per unit time is also proportional to the change in electron beam deflection angle per unit time, which is, in turn, proportional to the differentiated value of the horizontal deflection current. Accordingly, when the output voltage of low-pass filter 34 having a level proportional to the frequency of the index signal is integrated, the resulting value is proportional to the level of the horizontal deflection current.

In this embodiment, as previously discussed, the output voltage of low-pass filter 34, at a time when a constant beam current flows in cathode ray tube 10, is stored in memory 63. This signal is then read from memory 63 and applied to horizontal deflection correcting device 50. As a result, the signal is integrated by the self-inductance of correcting coil 53 and a correcting current, that is, a current that has an integrated value, flows through coil 53. The correcting current is adapted to flow in a direction whereby any deviation of the output voltage from low-pass filter 34 is decreased. As a result, such negative feedback control functions to correct the horizontal beam scanning rate to make the frequency of the index signal substantially constant.

In the embodiment of FIG. 1, by changing-over switch circuit 70 to input terminal W, it is possible to store the information signal containing information regarding the horizontal scanning rate by recording it in a read-only memory (ROM) at a factory or by providing means whereby it can be rewritten in the memory at any time.

Before discussing the correction of horizontal scanning rate resulting from fluctuation of the high voltage fed to the cathode ray tube, a description will first be given on the relationship between the such fluctuation of high voltage and the deflection speed error, with reference to FIGS. 4A and 4B.

If the horizontal deflection current is given as $I_d$, the deflecting amount or beam position of an electron beam as y, and the high voltage as $V_H$, respectively, the following relationship is obtained:

$$y = S \cdot I_d \cdot (V_H)^{-\frac{1}{2}} \quad (1)$$

where S is the deflection sensitivity of the deflection yoke.

Assuming that the deflection speed has a constant value $v_o$ when $V_H = V_{HO}$, an electron beam deviation $y_o(t)$, after the lapse of some time t, is given by the following equation:

$$y_o(t) = y_o + v_o t = S \cdot I_d \cdot (V_{HO})^{-\frac{1}{2}} \quad (2)$$

where $y_o$ is the initial position of the electron beam.

S and $I_d$ can be eliminated from equations (1) and (2) to obtain the following equation:

$$y(t) = (y_o + v_o t) \cdot \left( \frac{V_H(t)}{V_{HO}} \right)^{-\frac{1}{2}} \quad (3)$$

where $V_H(t)$ indicates the value of the high voltage at a time t.

Figure 4A:
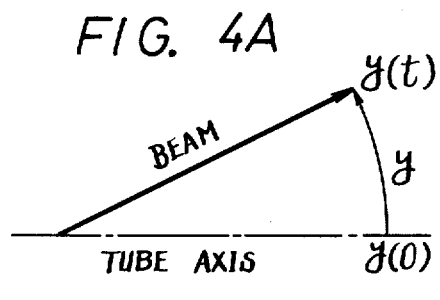
FIGS. 4A and 4B are graphical diagrams used for explaining the operation of the horizontal scanning rate correction apparatus according to this invention.

Equation (3) is representative of the position of the electron beam spot at a time t (refer to FIG. 4A). Accordingly, it should be appreciated that a change in the value of the high voltage from $V_{HO}$ to $V_H(t)$ results in a deviation of the position of the electron beam from the position corresponding to an unchanged or constant value of the high voltage. A beam deviation of the y(t), that is which corresponds to changes in the high voltage $V_H$, is obtained by taking the partial derivative of y(t) in equation (3) with respect to $V_H(t)$ as follows:

$$\frac{\partial y(t)}{\partial V_H(t)} = -\frac{1}{2} \left( \frac{V_H(t)}{V_{HO}} \right)^{-\frac{3}{2}} \cdot (y_o + v_o t) \cdot \frac{1}{V_{HO}} \div \quad (4)$$

$$-\frac{1}{2}(y_o + v_o t) \cdot \frac{1}{V_{HO}}$$

-continued $$\partial y(t) = -\frac{1}{2} \cdot (y_o + v_o t) \cdot \frac{\partial V_H(t)}{V_{HO}}$$

Figure 4B:
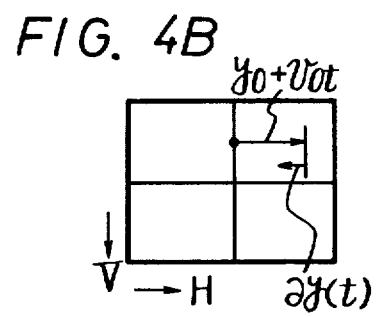

From equation (4), it should be understood that the deviation of the electron beam position following a fluctuation in the high voltage is $(-\frac{1}{2})$ times the ratio of such high voltage fluctuation to the constant high voltage $V_{HO}$ (See FIG. 4B).

The deflection speed v(t) at high voltage $V_H(t)$ is obtained by differentiating y(t) of equation (3) as follows:

$$v(t) = (d/dt) y(t)$$

Since y(t) of equation (3) includes two variables having a time dependency, that is, t and $V_H$, the above operation is carried out as follows:

$$dy(t) = \frac{\partial y(t)}{\partial t} dt + \frac{\partial y}{\partial V_H} dV_H$$

$$\frac{dy(t)}{dt} = \frac{\partial}{\partial t} y(t) + \frac{\partial y(t)}{\partial V_H(t)} \cdot \frac{dV_H(t)}{dt}$$

$$= v_o \left( \frac{V_H(t)}{V_{HO}} \right)^{-\frac{1}{2}} - \frac{1}{2}(y_o + v_o t) \frac{1}{V_{HO}} \cdot \frac{dV_H(t)}{dt}$$

In this case, if an expansion is made as follows:

$$\left( \frac{V_H(t)}{V_{HO}} \right)^{-\frac{1}{2}} \div 1 - \frac{1}{2} \frac{\partial V_H(t)}{V_{HO}}$$

the following equation is obtained:

$$v(t) = v_o \left( 1 - \frac{1}{2} \frac{\partial V_H(t)}{V_{HO}} \right) - \frac{1}{2}(y_o + v_o t) \cdot \frac{1}{V_{HO}} \cdot \frac{d}{dt} V_H(t) \quad (5)$$

Accordingly, deflection speed error $\Delta v(t)$ can be expressed as follows:

$$\Delta v(t) = v(t) - v_o \quad (6)$$

$$= -\frac{v_o}{2} \cdot \frac{1}{V_{HO}} \cdot (V_H(t) - V_{HO}) - \frac{1}{2}(y_o + v_o t) \cdot \frac{1}{V_{HO}} \cdot \frac{d}{dt} V_H(t)$$

As a result, if a signal containing information about the deflection speed error is supplied to horizontal deflection correcting device 50 to cancel the deflection speed error $\Delta v(t)$, the horizontal deflection distortion caused by fluctuation in the level of high voltage $H_V$ can be improved.

A circuit arrangement embodying the basis of equation (6) will next be described. Equation (6) can be rewritten as follows:

$$\Delta v(t) = a(V_H(t) - V_{HO}) - b \cdot x_H \cdot (d/dt) V_H(t) \quad (7)$$

where $$a = \frac{-v_o}{2V_{HO}} = \text{constant}$$

$$b = \frac{1}{2V_{HO}} = \text{constant}$$

$$x_H = y_o + v_o t$$

Thus, a correcting signal forming circuit can be formed on the basis of the above equation (7).

Referring back to FIG. 1, there is shown such a correcting signal forming circuit 100. High voltage $V_H(t)$, which is produced by a high voltage source on generator 91 and fluctuating which fluctuates according to the beam current, is supplied to an anode of picture tube 10 and also to a first variable resistor 92 to derive therefrom a voltage $aV_H(t)$. A constant voltage $-aV_{HO}$ is derived from a second variable resistor 93 which is connected between a negative reference voltage $-B$ and ground. These voltages $-aV_{HO}$ and $aV_H(t)$ are supplied to a mixer 94 where they are added to form the voltage $a(V_H(t) - V_{HO})$ which is equal to the first term in equation (7).

Figure 3:
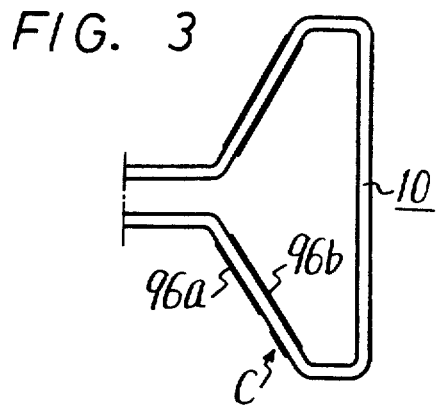
FIG. 3 is a schematic plan view showing one embodiment of a capacitance formed in the cathode ray tube for use in the differentiation circuit of the horizontal scanning rate correction apparatus according to this invention.

Next, high voltage $V_H(t)$ is differentiated by a differentiation circuit 95 to produce a differentiated output $(d/dt)V_H(t)$. A capacitor C provided in differentiation circuit 95 is preferably formed, as shown in FIG. 3, between a separated portion of a carbon layer 96a on the exterior surface of the funnel portion of picture tube 10 and an interior carbon layer 96b thereof.

Referring back to FIG. 1, it is seen that horizontal deflection device 40 is comprised of a horizontal deflection coil which is supplied with a horizontal deflection signal from a deflection circuit 41 whereby a horizontal deflection current flows through the horizontal deflection coil. Since this horizontal deflection current controls the amount of electron beam deflection y, if a resistor 96 is connected in series with the horizontal deflection coil, as illustrated, an output $x_H$ corresponding to such electron beam y deflection is obtained across resistor 96.

The aforesaid differentiated output $(d/dt) \cdot V_H(t)$ and output $x_H$ are supplied to a multiplier circuit 97 where they are multiplied with each other, and thus multiplied output is then supplied to a third variable resistor 98 to form the output of the second term in equation (7), that is $b \cdot x_H \cdot (d/dt) \cdot V_H(t)$. This output or second term is supplied to a negative input of mixer 94 to provide a correcting signal $-S_C$ which is proportional to $\Delta v(t)$ of equation (7).

Correcting signal $-S_C$ is phase inverted by an inverter 99 and the phase-inverted signal $S_C$ is supplied to a mixer 110 where it is added with the memory output from D-A converter 64. This mixed output is then supplied through drive circuit 66 to horizontal deflection correcting device 50.

As described above, according to this invention, a signal including information regarding the horizontal beam scanning rate is obtained from low-pass filter 34 of PLL circuit 30 at a time when a predetermined beam current flows to picture tube 10. At this time, such signal is written into memory 63 as a correcting signal and the correcting signal is later read from memory 63 and supplied to horizontal deflection correcting device 50 to correct any deviations in the horizontal deflection linearity or horizontal scanning rate. Also, the deflection speed error signal functions to eliminate the deflection speed error caused by fluctuation in the high voltage supplied to the cathode ray tube so as to further correct any deviation in the horizontal beam scanning rate. Thus, scanning rate correction is achieved with high accuracy.

Accordingly, the frequency of the index signal is fixed at a substantially constant value, whereby being color misregistration is prevented. Further, this results in the PLL circuit being locked to the input index signal so as to obtain good color reproduction.

Equation (7) can be rewritten as follows:

$$\Delta v(t) = a(V_H(t) - V_{HO}) - b \cdot x_H \cdot \frac{I_K(t)}{C'} \tag{8}$$

$$\text{where } \frac{d}{dt} V_H(t) = \frac{I_K(t)}{C'}$$

and where $I_K(t)$ is the cathode current and $C'$ is the capacitance between picture tube 10 and ground.

Figure 5:
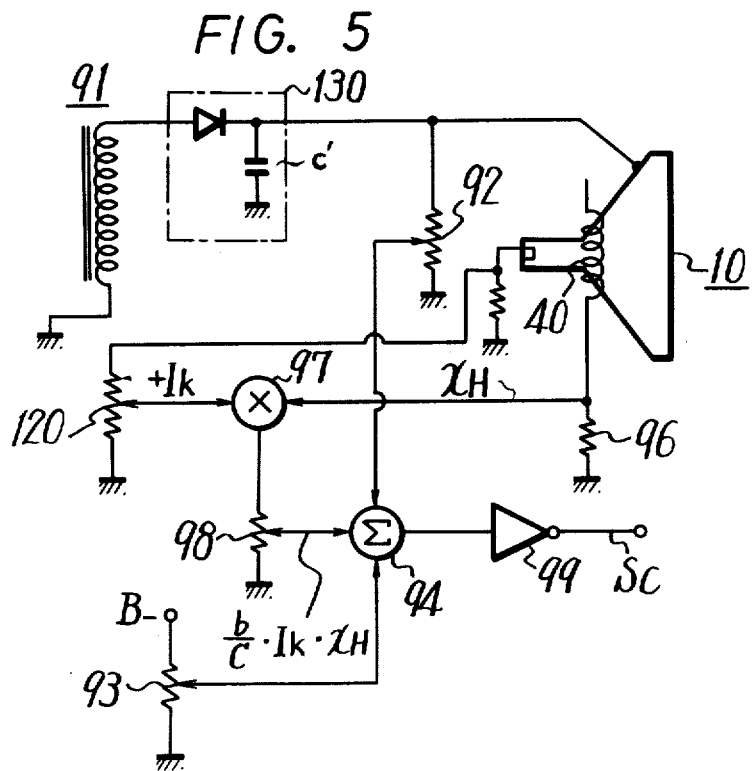
FIG. 5 is a block diagram of another embodiment of a correcting signal forming circuit used in the horizontal scanning rate correction apparatus according to this invention.

Referring now to FIG. 5, another embodiment of correcting signal forming circuit 100 there is shown according to this invention in which elements corresponding to those described above with reference to the circuit of FIG. 1 are identified by the same numerals. In this modified circuit, cathode current $I_K$ is detected at the cathode of picture tube 10 and adjusted by a variable resistor 120 from which it is supplied to multiplier circuit 97. The construction of the circuit according to this embodiment thus eliminates the need for capacitor C used in differentiation circuit 95 in the connecting signal forming circuit of FIG. 1. In the circuit of FIG. 5, reference numeral 130 indicates a rectifier circuit.

From equation (7), if the following relation exists:

$$a(V_H(t) - V_{HO}) >> b \cdot x_H \cdot \frac{d}{dt} V_H(t) \tag{9}$$

Equation (7) can be modified as follows:

$$v(t) \approx a(V_H(t) - V_{HO}) \tag{10}$$

As a result, a circuit for producing a signal representative of the second term of equation (7) may be omitted from the correcting signal forming circuit 100.

It should be appreciated that horizontal deflection correcting device 50 may be comprised of a static deflection device. Further, in place of the horizontal deflection correcting device, it is possible to provide, for example, a saturable reactor having its secondary side connected in series to the horizontal deflection coil and its primary side supplied with the correcting signal read from memory 63 whereby the amplitude of the horizontal deflection current is controlled in response to the correcting signal.

In the apparatus of this invention, detected fluctuation of the high voltage supplied to the cathode ray tube is processed to modulate the horizontal beam scanning rate. In addition to the aforesaid scanning rate modulation, if signal $S_C$ from inverter 99 is applied to the output of low-pass filter 34 of PLL circuit 30, as shown by dotted line 140 in FIG. 1, the phase of the output signal of PLL circuit 30 can be advanced at a fast response speed and the index signal can be accurately processed.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. Horizontal scanning rate correction apparatus for a cathode-ray tube having a screen, means for projecting an electron beam upon said screen, an anode supplied with a high voltage from a high voltage source, and a beam deflection device supplied with at least horizontal and vertical beam deflection signals for causing said beam to repeatedly scan across said screen in a vertical succession of horizontal lines, said apparatus comprising:

memory means for storing a plurality of correction values representing deviations of the horizontal scanning rate of said electron beam from a desired scanning rate;

reading means for reading said plurality of stored correction values from said memory means;

correcting signal forming means for sensing fluctuation in the value of said high voltage from the high voltage source and for producing a correcting signal in response thereto; and scanning rate modulating means supplied with the plurality of correction values read by said reading means and supplied with the correcting signal from said correcting signal forming means for substantially cancelling any deviations in the horizontal scanning rate from said desired scanning rate.

2. Horizontal scanning rate correction apparatus according to claim 1; in which said correcting signal forming means includes means for generating a first signal proportional to the level of said high voltage, means for generating a second signal having a constant value, and mixer means for adding said first and second signals to form an added output signal.

3. Horizontal scanning rate correction apparatus according to claim 2; in which said correcting signal forming means includes differentiating means supplied with said high voltage for producing a differentiated high voltage signal, means connected to said beam deflection device for producing a signal corresponding to the amount of horizontal electron beam deflection, and multiplier means for multiplying said differentiated high voltage signal and said signal corresponding to the amount of horizontal electron beam deflection to form a multiplied output signal, whereby said correcting signal is formed by the subtraction of said added output signal from said multiplied output signal.

4. Horizontal scanning rate correction apparatus according to claim 3; in which said differentiating means includes a capacitance element connected in series between said multiplier means and said high voltage source and a resistive element connected between ground and said capacitance element, and said means for producing a signal corresponding to the amount of horizontal beam deflection includes a resistive element connected between said beam deflection device and ground.

5. Horizontal scanning rate correction apparatus according to claim 2; in which said means for generating a first signal variable resistive means connected between said high voltage source and ground and said means for generating a second signal includes a second voltage source and a variable resistive element connected between said second voltage source and a reference potential.

6. Horizontal scanning rate connecting apparatus according to claim 2; in which said cathode-ray tube further includes a cathode and in which said correcting signal forming means includes means for producing a signal proportional to current at said cathode, means connected to said beam deflection device for producing a signal corresponding to the amount of horizontal electron beam deflection, and multiplier means for multiplying said signal proportional to said cathode current and said signal corresponding to the amount of horizontal electron beam deflection to form a multiplied output signal, whereby said correcting signal is formed by the subtraction of said added output signal from said multiplied output signal.

7. Horizontal scanning rate correction apparatus according to claim 1; in which said cathode-ray tube is an index type color cathode-ray tube having a plurality of index elements positioned to be struck by said electron beam as it scans across said screen, color switching circuitry for modulating the intensity of said beam with primary color signals in correspondence with the position of said electron beam on said screen, and an index signal processing circuit for producing an index signal of a frequency determined by the frequency of the incidence of said beam upon said index elements as it scans across said screen and for controlling said color switching circuitry; and in which means are provided for producing said plurality of correction values from said index signal.

8. Horizontal scanning rate correction apparatus according to claim 7; in which said index elements are spaced across said screen so that the frequency of said index signal varies in proportion to variations in said horizontal scanning rate, and in which said plurality of correction values, as stored in said memory means, include information regarding changes in the frequency of said index signal.

9. Horizontal scanning rate correction apparatus according to claim 8; in which said index signal processing circuit includes a plane-locked loop having a phase comparator receiving said index signal as a first input signal, a voltage-controlled oscillator, means connected to the output of said phase comparator for supplying a control voltage to said voltage-controlled oscillator, and means for supplying a second input signal to said phase comparator the frequency of which is controlled by the output of said voltage-controlled oscillator so that said output of the phase comparator varies with changes in said index signal to provide a corresponding change in the output of said voltage-controlled oscillator; and in which said plurality of correction values are derived from said control voltage supplied to said voltage-controlled oscillator.

10. Horizontal scanning rate correction apparatus according to claim 1; in which said memory means includes a random access memory for storing said correction values.

11. Horizontal scanning rate correction apparatus according to claim 1; in which said scanning rate modulating means includes mixer means for adding said correction values and said correcting signal to form an added output signal and horizontal deflection correcting means for cancelling any deviations in the horizontal scanning rate in response to said added output signal.

12. Horizontal scanning rate correction apparatus according to claim 11, in which said beam deflection device includes at least one deflection coil for receiving said horizontal and said vertical beam deflection signals, respectively, and said horizontal deflection correcting means includes a correction coil separate from said at least one deflection coil for receiving said added output signal.

* * * * *